Patented Sept. 4, 1951

2,566,815

UNITED STATES PATENT OFFICE 2,566,815

EPOXY-HEXENYLIDENE IMINES AND INSECTICIDAL COMPOSITIONS THEREOF

Richard R. Whetstone, Berkeley, Calif., assignor to Shell Development Company, San Francisco, Calif., a corporation of Delaware No Drawing. Application August 16, 1947, Serial No. 769,065

16 Claims. (Cl. 260—240)

This invention relates to a new and highly useful class of heterocyclic aldimines; and to novel products formed by their autopolymerization and having the characteristics of dimers of the aldimines. The invention also includes a particularly advantageous method for the preparation of the products to which it relates.

The novel aldimines with which the invention is concerned contain an imino nitrogen atom that is attached by a double bond to a 3,4-dihydro-1,2-pyran-2-methylene radical, i. e., a 2,6-epoxy-5-hexenylidene radical

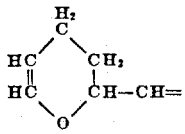

and by a univalent bond to a hydrocarbon radical which may or may not be further substituted by one or more additional atoms or groups of atoms other than carbon and hydrogen. The 2,6-epoxy-5-hexenylidene radical may contain up to two lower alkyl groups, such as methyl, ethyl, and other alkyl groups containing up to about six carbon atoms, attached to carbon atoms in the heterocyclic ring, or, more desirably, it may be the unsubstituted 2,6-epoxy-5-hexenylidene radical. A preferred group of the novel aldimines contains the unsubstituted 2,6-epoxy-5-hexenylidene radical and a total of from 9 to about 24 carbon atoms.

The aldimines of the present novel class have been found to possess unexpected and particularly desirable properties. They are of notably improved value in numerous applications. Their value and their unexpected properties are due in part to the particular configuration relative to one another of the hydrocarbyl-substituted imino nitrogen atom, the oxygen atom in the 2,6-epoxy-5-hexenylidene radical, and the multiple bond in the heterocyclic ring of the 2,6-epoxy-5-hexenylidene radical. The unique structure of the present novel aldimines, including the character of the hydrocarbon group that is attached to the imino nitrogen atom, imparts characteristic and valuable properties that render the novel compounds distinctly different from aldimines heretofore known. By virtue of their unique structure, the new compounds are highly useful in many industrially and economically important applications in which previously known aldimines are unsuitable or much less desirable. Because of the low cost of the primary raw materials which may be employed for their manufacture, many of the present novel aldimines offer substantial advantages in the matter of low cost which further enhance their potential value in industry.

It has been discovered that the new aldimines may form by autopolymerization, i. e., by spontaneous polymerization, useful products having the characteristics of dimers of the aldimines. This tendency is most noticeable when the monomeric aldimine contains the unsubstituted 2,6-epoxy-5-hexenylidene radical, particularly when an aromatic hydrocarbon group is attached to the imino nitrogen atom. These products that are thus formed by autopolymerization of the novel monomeric aldimines have the same empirical formula, i. e., contain the same proportions of elements, as the respective monomeric aldimines, but have in each case a molecular weight twice that of the monomeric aldimine. In the case of the lower aldimines that normally exist as liquids, the corresponding dimers frequently may be crystalline solids. Those aldimines which are normally solid, or crystalline, may exhibit less tendency to form the dimeric products, possibly because of a stabilizing effect of the solid state vs. the liquid state. In any case, difference between the monomeric aldimine and its dimer, or between different mixtures of the two, readily may be detected, for example by suitable determinations of melting point, solubility, molecular weight, or the like. The monomeric aldimine and its dimer frequently may coexist as an equilibrium mixture of the two, the position of the equilibrium depending upon the particular identity of the aldimine, and the conditions, such as temperature, etc., under which the mixture is maintained.

The chemical structure of these dimeric products is unknown. The dimers may revert to the monomeric form, for example under the influence of heat, or of conditions liable to be encountered during chemical experimentation to determine their structure. Because of their complexity, and their susceptibility to the influences of their chemical environment, an elucidation of their exact chemical structure could require an exceedingly prolonged investigation, with uncertain liklihood of a completely successful outcome.

The novel compounds and products of the present invention, because of their unique and especially advantageous properties, are useful for a variety of purposes. The aldimines may be hydrogenated to form valuable secondary amines containing the 2,6-epoxy-5-hexenylidene radical or its saturated analog, the 2,6-epoxyhexylidene radical, and alkyl substitution products thereof. The present aldimines and the dimers thereof, may be employed advantageously as active agents in the compounding and curing of rubber. They are highly useful chemical intermediates, e. g., as starting points for the synthesis of derived chemical products, such as products useful as lubricating oil additives, detergents, surface-active agents, biologically active compounds, and the like.

The present novel aldimines and the dimeric products formed by their autopolymerization are especially useful and valuable as insecticides. It has been found that the presence of the unsubstituted 2,6-epoxy-5-hexenylidene radical attached by a double bond to the imino nitrogen atom, contributes significantly to the insecticidally activity of the aldimines and the dimers of such aldimines. For example, a mixture of N-phenyl-2,6-epoxy-5-hexenylidenimine with its dimer has been found to have a highly toxic action towards insects, particularly houseflies, when applied in a manner and in amounts customarily employed in a standardized test for insecticidal activity. On the other hand, a dimethyl substitution product of this aldimine N-phenyl-2,5-dimethyl-2,6-epoxy-5-hexenylidenimine, when tested in an equivalent manner, exhibited little if any toxic action upon houseflies exposed to it in amounts within the range practicable for ordinary insecticidal usage.

I have discovered that the present novel aldimines may be prepared with particular advantage by reacting 2,6-epoxy-5-hexen-1-al, i. e., 3,4-dihydro-1,2-pyran-2-carboxaldehyde

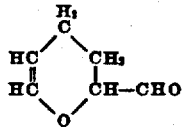

or an alkyl substitution product thereof, e. g., one containing lower alkyl groups attached to the carbon atoms in the 2 and/or 5 positions of the heterocyclic ring, with a primary organic amine in the absence of conditions or materials which would favor undesired side reactions, degradation, condensation, polymerization, or like reactions. The reaction most desirably may be effected by reacting the stated reactants in the absence of any added materials having catalytic activity toward the reactants. The desired reaction may be brought about most efficaciously by withdrawing the water formed in the reaction substantially as soon as it is formed. This may be accomplished in a variety of ways. One particularly effective method comprises heating a mixture of the selected reactants, in the presence of an organic solvent if desired, to the boiling point, and continuously separating water from the evolved vapors prior to their return, as by reflux condensation, to the liquid reaction mixture. The separation of the water most conveniently may be accomplished by heating the reaction mixture in a reaction vessel equipped with a reflux distillation column having means for separating water from the vapors and/or the condensate. By maintaining a high total reflux, the water formed by the reaction may be removed substantially as soon as it is formed, the desired reaction thereby being favored and brought to completion within a reasonable and advantageously short period of time, generally not over about 6 hours. When no more water is evolved from the reaction mixture, i. e., when the reaction is for practical purposes complete, the reaction mixture remaining in the vessel may be treated in any suitable manner to recover the desired aldimine. If the desired aldimine is one that is autopolymerizable to a dimeric product, e. g., one containing in its monomeric state the unsubstituted 2,6-epoxy-5-hexenylidene radical, appreciable amounts of the dimeric product may be formed during the synthesis of the aldimine. The monomeric aldimine may be separated from its dimer at this time, or such separation may be postponed until any convenient later time, depending upon the method of recovery that is employed. The reaction mixture frequently may be submitted to fractional distillation to separate from the desired products any unreacted reactants that may be present. The monomeric aldimines also may be separated from their dimers by fractional distillation, although because of the lower volatility of the dimers it may be more desirable to effect their further purification by other means, such as by crystallization from organic solvents, by fractional precipitation with the aid of selective solvents, etc.

Although the foregoing procedure is widely applicable to the preparation of the novel products to which the invention is directed, suitable modifications therein may be made as desired or as required by the nature of the specific reactants that are employed. It thus may be desirable to include in the reaction mixture a suitable inert solvent, i. e., an organic solvent that is inert both to the reactants and to the products of the reaction. Suitable solvents include, for example, ethers, esters, hydrocarbons, heterocyclic oxygen-containing solvents, e. g., dioxane, and the like. By regulating the amount and the kind of the solvent, the reflux temperature of the reaction mixture may be controlled conveniently. Temperatures of from about 40° C. to about 200° C., preferably from about 75° C. to about 150° C., may be employed. If the solvent is one which forms an azeotrope with water, the azeotropic mixture may be separated from the reaction mixture and the solvent subsequently recovered. Additional amounts of the solvent may be added to the reaction mixture either intermittently or continuously to replace the solvent removed in the azeotropic mixture.

The water, or the azeotropic mixture containing the water, may be separated from the total vapors evolved from the reaction mixture in any suitable manner, including fractional condensation, total condensation followed by stratification, extraction, salting out, treatment with drying agents, or the like.

The novel products to which the invention relates may be prepared by either a continuous, an intermittent or batchwise type of process. Addition of the reactants may be made in one or a plurality of zones and the water formed by the reaction may be completely removed as it is formed, in one separating means, or a plurality of separating means may be employed with partial separation in each. If it is desired to prepare only a single aldimine of the present class, only the required pair of reactants ordinarily will be employed. More than one aldimine may be prepared, if desired, by reacting a plurality of primary organic amines with one or a plurality of the above-described heterocyclic aldehydes. In the majority of cases, it is highly effective to heat the reaction mixture containing the heterocyclic aldehyde and the primary organic amine to the boiling point, say, between 40° C. and 200° C.

under atmospheric pressures. If desired, pressures either above or below atmospheric may be employed to raise or lower, respectively, the boiling point from the temperature it would have under atmospheric pressures.

A variety of primary organic amines may be reacted with the above-described 2,6-epoxy-5-hexen-1-al and with its alkyl substitution products to obtain useful and valuable products according to the invention. Depending upon the particular primary organic amine that is employed, there may be obtained products having advantageous and distinctive characteristics above and beyond those characteristics imparted by the presence of the 2,6-epoxy-5-hexenylidene radical that is attached to the imino nitrogen atom. One group of particularly valuable aldimines which has been provided by the present invention contains the 2,6-epoxy-5-hexenylidene radical, or a lower-alkyl substitution product thereof, bonded to an imino nitrogen atom that is directly attached by a univalent bond to an aliphatic carbon atom that, in turn, is attached by a univalent bond to an olefinic carbon atom. This olefinic carbon atom desirably may be attached to a terminal olefinic carbon atom i. e., to a carbon atom of a methylene ($=CH_2$) group. These N-(2-alkenyl) imines within the present class, because of the number and location of the multivalent bonds, are highly reactive. They may be employed with advantage, for example, as ingredients of polymerizable, e. g., resinifiable, mixtures, and in other useful applications. Primary amines which may be employed for their preparation are exemplified by 2-propenyl amine (allyl amine), 2-methyl-2-propenyl amine (methallyl amine), 2-ethyl-2-propenyl amine, and the like and their homologs. A further valuable group of imines which has been provided by the present invention is represented by the imines in which the second group attached to the imino nitrogen atom is a higher alkyl group, preferably a straight-chain or branched-chain alkyl group containing from 8 to 18 carbon atoms, such as the octyl, nonyl, decyl, tetradecyl, hexadecyl, and octadecyl groups and their straight-chain and branched-chain homologs and branched-chain analogs. The novel aldimines within this group may be prepared conveniently according to the herein described method by reacting the corresponding primary alkyl amine containing from 8 to 18 carbon atoms with the heterocyclic aldehyde and removing the water that is formed substantially coincident with its formation, preferably as an azeotrope with a suitable inert, volatile organic solvent or a plurality of such solvents. Valuble N-aryl-2,6-epoxy-5-hexenylidenimines may be prepared by reacting 2,6-epoxy-5-hexen-1-al or one of its lower alkyl substitution products with primary aryl amines, such as aniline and its primary amine homologs and substitution products containing one or a plurality of aromatic rings. A preferred group of N-aryl-2,6-epoxy-5-hexenylidenimines comprises those in which the 2,6-epoxy-5-hexenylidene radical is unsubstituted and the aryl group comprises not more than one aromatic nucleus. Functional groups in addition to the primary amino group may be present in the primary organic amine that is employed as the amine reactant, provided such additional groups and atoms are of such a nature that they are non-reacting under the conditions of the process so as not to interfere with the successful execution of the process as by the formation of undesired by-products, etc.

The additional atoms may be present as in a heterocyclic ring, e. g., a nitrogen-, oxygen-, sulfur-containing or an analogous heterocyclic ring, or they may be present as substituents attached to carbon atoms in an open-chain or carbocyclic group of atoms. Representative substituent groups which may be present include, for example, halogen, nitro, sulfo, esters, and like groups.

Further examples of specific primary organic amines which may be employed in the preparation of novel compounds within the invention, and in certain cases within the preferred groups of compounds hereinbefore and hereinafter referred to, include, among others, the following: 2-butenyl amine, 3-pentenyl amine, 1-methyl-2-butenyl amine, 2-isopropyl-2-propenyl amine, 2-butyl-2-propenyl amine, 2-phenyl-2-propenyl amine, 3-phenyl-2-propenyl amine, 2,4-hexadienyl amine, ethyl amine, propyl amine, isopropyl amine, pentyl amine, neo-pentyl amine, octyl amine, decyl amine, stearyl amine, oleyl amine, cyclohexyl amine, cyclopentyl amine, 3-cyclohexenyl amine, 2-methyl-3-cyclohexenyl amine, aniline, p-chloroaniline, the naphthyl amines, 3,5-xylidine, 2,4-xylidine, the nitroanilines, the nitroxylidines, 2,6-epoxy-5-hexenyl amine, 2,6-epoxyhexyl amine, N-methyl-2-piperidene amine, 2-aminopyridine, 3-methyl-2-aminopyridine, furfuryl amine, tetrahydrofurfuryl amine, and analogous and homologous primary amines.

The following example will illustrate the preparation of one of the compounds to which the invention relates. In this and the following examples, the parts are by weight.

*Example I*

Three hundred parts of 2,6-epoxy-5-hexen-1-al and 232 parts of aniline (equimolar quantities) were mixed in 325 parts of benzene with formation of heat and water. The water was removed as it was evolved by refluxing the mixture under a reflux column equipped with a phase separating head, heat being supplied as required, and withdrawing water until no more water was formed. When evolution of water was complete, the benzene was removed by distillation. The tarry reaction product was extracted with 400 parts of 35° to 60° petroleum ether. There remained 81 parts of crude solid which after recrystallization from petroleum ether melted at 163° C. to 164° C. Distillation of the petroleum ether extract resulted in the recovery of 144 parts of a viscous red oil distilling at 125-154° C. under 2 to 4 mm. Hg, and having a refractive index ($n_D^{20}$) of 1.6025–1.6145.

The liquid product was identified as N-phenyl-2,6-epoxy-5-hexenylidenimine having the probable structure

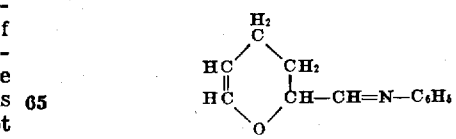

It was found to contain 76.75% C, 7.07% H, and 8.94% N, and to have a molecular weight (ebullioscopic in benzene) of 198, compared to calculated values for the above formula of 76.98% C, 7.00% H, and 7.48% N, and a calculated molecular weight of 187. The solid crystalline product was identified as the dimer of the above imine. It was analyzed and found to contain 77.50%

C, 7.10% H, and 7.16% N, compared to the foregoing calculated values, and to have a molecular weight (ebullioscopic in methyl ethyl ketone) of 373 compared to a theoretical value of 374. The liquid product in several weeks at room temperature darkened, became very viscous, and partly crystallized, the crystalline product being the same as the crystalline product directly prepared in the above experiment.

As illustrated in the foregoing example, it is convenient to employ the heterocyclic aldehyde and the primary organic amine in equimolar amounts. Because the reaction by which the products are formed is an equilibrium reaction, increased conversions based on one of the reactants frequently may be favored by the presence of a moderate excess of the other. For example, when one reactant may be more precious than the other, the more readily available reactant frequently may be used in excess, say up to 2 or more moles per mole of the second reactant, with advantageous results.

The following examples will illustrate further the products and the process of the invention:

Example II

A mixture of 112 parts of 2,6-epoxy-5-hexen-1-al, 75.5 parts of methallyl amine, and 130 parts of benzene was heated to boiling in a reaction vessel equipped with a reflux column with a phase separating head, and water was withdrawn until no more separated. About 3 hours' heating was required. The remaining mixture was fractionally distilled under a pressure of 1 mm. Hg. After removal of the benzene, the following fractions were collected:

| No. | Distillation Temperature | Amount |
|---|---|---|
|  |  | Parts |
| 1 | 55 to 57° C | 5 |
| 2 | 57 to 62° C | 71 |
| 3 | 62 to 73° C | 38 |
| Bottoms |  | 49 |

Fraction 2 was redistilled under a pressure of 5 mm. Hg with separation of 62 parts of N-methallyl - 2,6 - epoxy - 5-hexenylidenimine distilling from 76.4° to 77.4° C. and having a refractive index ($n_D^{20}$) of 1.4828. The imine has a structure represented by the formula

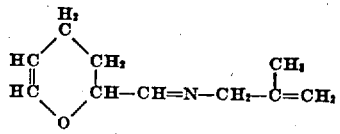

Analyses: found, 72.17% C, 9.15% H, and 8.35% N; calculated for $C_{10}H_{15}ON$, 72.72% C, 9.09% H, and 8.48% N.

Example III

A mixture of 78.5 parts of 2,6-epoxy-5-hexen-1-al, 96.5 parts of p-nitroaniline, and 200 parts of benzene was heated under reflux distillation and with withdrawal of evolved water until no more water separated. About 3 hours' heating was required. After cooling, the benzene was decanted from the sparingly soluble product, and the product was dissolved in 200 parts of methyl ethyl ketone. The product was precipitated from solution by addition of 950 parts of isopropyl alcohol to the solution. The precipitate was dissolved in acetone and reprecipitated by addition of isopropyl alcohol to the acetone solution. Fifty-four parts of the recrystallized product were obtained. The product was a bright yellow solid melting at 214° to 217° C., with decomposition, believed to be the dimer of the imine having the structure

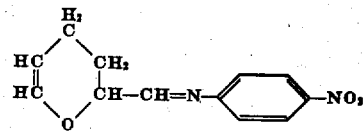

The solid was analyzed and found to contain 59.28% C, 5.76% H, and 11.1% N, compared to calculated value of 62.07% C, 5.21% H, and 12.07% N.

Example IV 2,6-epoxy-5-hexen-1-al and p-chloroaniline were reacted in the presence of benzene in the manner employed in the preceding example. The product, believed to be the dimer of the imine N - (p-chlorophenyl)-2,6-epoxy-5-hexenylidenimine having the structure

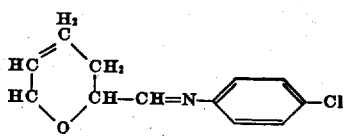

crystallized from the cold reaction mixture in a yield of 43.5% based on the amounts of the reactants employed. After recrystallization from benzene, the product melted at 187° to 189° C. Analyses: Calculated for $C_{24}H_{24}N_2O_2Cl_2$, 65.01% C, 5.46% H, 6.32% N, and 16.0% Cl; found, 65.33% C, 5.46% H, 6.18% N, and 15.7% Cl.

Example V

A mixture of 224 parts of 2,6-epoxy-5-hexen-1-al and 258 parts of n-octylamine in benzene was heated at the reflux temperature with withdrawal of water according to the method of the preceding examples until evolution of water ceased. The benzene was removed by distillation and the remaining residue was distilled under reduced pressure. N-octyl-2,6-epoxy-5-hexenylidenimine having the formula

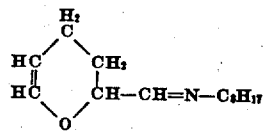

was recovered in a yield of 83% as the fraction distilling from 107° to 128° C. under a pressure of 1–2 mm. Hg, and having a refractive index ($n_D^{20}$) of 1.4681. Analyses: found, 74.81% C, 11.20% H, and 6.07% N; calculated for $C_{14}H_{25}NO$, 75.29% C, 11.28% H, and 6.27% N.

Example VI 2,6-epoxy-5-hexen-1-al and 2-aminopyridine present in equimolar quantities were reacted in benzene at the reflux temperature according to the method of the preceding examples, with withdrawal of water until evolution of water ceased. The benzene was removed by distillation leaving a tarry residue. The residue was extracted with ethanol. The product, believed to be the dimer of N-(2-pyridyl)-2,6-epoxy-5-hexenylidenimine was recovered from the ethanol extract in a yield of 23%. The product was found to melt at 138–143° C., and it was found to have a molecular weight (ebullioscopic in benzene) of 373 compared to a molecular weight of 376 calculated for $(C_{11}H_{12}ON_2)_2$.

Example VII 2,5-dimethyl-2,6-epoxy-5-hexen-1-al and aniline were reacted according to the method employed in the preceding examples, and the product was recovered by fractional distillation. N-phenyl-2,5-dimethyl-2,6-epoxy-5 - hexenylidenimine

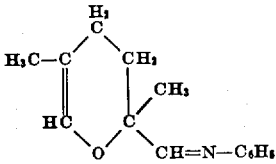

was recovered in a yield of 85% based on the amount of the reactants employed, as the fraction distilling between 110° C. and 114° C. under a pressure of 1 mm. Hg. Of this fraction, 90% distilled between 110° C. and 111° C. This lower boiling portion was found to have a refractive index ($n_D^{20}$) of 1.5438. Analyses: Calculated for $C_{14}H_{17}ON$: 78.60% C, 7.90% H, 6.51% N. Found 77.52% C, 7.87% H, 6.41% N.

Example VIII 2,5-dimethyl-2,6-epoxy-5 - hexen - 1 - al and methallyl amine were reacted according to the method of the preceding examples, and the product was recovered by fractional distillation. N-methallyl-2,5 - dimethyl - 2,6 - epoxy-5-hexenylidenimine

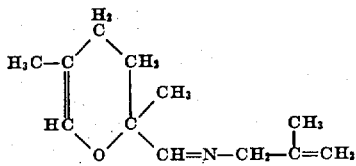

distilling at 64° to 65.5° C. under a pressure of 1.5 millimeters Hg and having a refractive index ($n_D^{20}$) of 1.4740, was recovered in a yield of 88% of theory. Calculation for $C_{12}H_{19}ON$: 74.61% C, 9.84% H, 7.25% N; found 74.39% C, 9.87% H, 7.03% N.

As I have indicated previously herein, the novel aldimines of the present class which contain an unsubstituted 2,6-epoxy-5-hexenylidene radical attached to the imino nitrogen atom, and the dimeric products formed by their autopolymerization, particularly such imines which also contain an aryl group directly attached to the imino nitrogen atom, and the corresponding dimeric products, have particular utility and value as insecticides, and ingredients of insecticidal compositions. Those imines, and their corresponding dimeric autopolymers, which contain a phenyl group or a substituted phenyl group attached to the imino nitrogen atom are particularly advantageous for this application. They may be applied either alone or in combination with other active or inactive substances, to plants, animals, fabrics, dwelling structures, and the like, by any suitable method, including spraying, dusting, dipping, etc., in the form of concentrated liquids, solutions, suspensions, emulsions, dusting powders, etc., or other suitable ways. For instance, they may be used advantageously in the form of dilute solutions in any of the solvents which are suited to use in insecticidal compositions and in which they are sufficiently soluble, including solvents such as petroleum distillates, paraffin oils, lignite tar oils, naphthenes, chlorinated hydrocarbons, chlorinated ethers, ketones, mono- and polyhydric alcohols, glycol ethers, or other solvents or mixtures thereof.

The above-mentioned new imines, and the dimeric products of their autopolymerization, are particularly valuable when it is desired to have an insecticidal agent having a strong lethal activity upon insects, as contrasted to these insecticides which exhibit a strong paralytic, but not always lethal action. Because of their highly lethal action, in conjunction with their low cost, the new insecticidal agents may be employed with advantage to supplement the action of less lethal agents which have a high paralytic action upon insects, with consequent economy at no sacrifice in effectiveness.

For use in sprays, such, for example, as household insecticidal sprays and sprays to be used for control of insects, particularly flies, in other inhabited structures, the novel insecticides are valuable because they combine a high activity with a low volatility and a low odor and irritant action to man and other warm-blooded animals. They are useful for application when it is desired to kill insects present at the time of application, and also as residual insecticides which are effective over a prolonged period of time after the application. When used in this manner, the novel insecticides may be applied in the form of a dilute suspension in a non-odoriferous solvent medium, such as a highly refined kerosene distillate, either as the sole insecticidal agent or with other insecticides. Relatively dilute solutions may be employed effectively, containing generally from about 0.5% to about 25% preferably from about 2 to about 12% by weight of the active agent.

Insecticides provided by the invention have been used to kill adult houseflies in a high proportion of those subjected at any one time to the action of the new insecticides. In one comparative test, employing the test method known as the Martinez Flowing Mist Test, groups of adult houseflies containing from 50 to 100 individual flies in a cylindrical wire cage 5" in diameter and 8" in height were exposed under standardized conditions to a mist of an atomized solution of the insecticide being tested flowing through a horizontal tube 5 feet long and 14 inches in diameter, the cage being placed inside the tube near the outflow end. Under the conditions of the tests, and with the amounts of the compound being subjected to test, an equilibrium mixture of N-phenyl-2,6-epoxy-5-hexenylidenimine and its dimer caused the death of 46% of the houseflies exposed to its action. On the other hand, under equivalent conditions, N-phenyl-2,5-dimethyl-2,6-epoxy-5-hexenylidenimine was found to be without lethal effects upon the houseflies exposed to its action. A comparison of the activity of a 1% solution of N-phenyl-5-hexenylidenimine in acetone with a 2.5% solution of Lethane 384 Special (a commercial insecticide manufactured by the Rohm and Haas Co., Philadelphia, and containing a mixture of butyl carbitol thiocyanate and beta-thiocyano esters of higher fatty acids as the active ingredient) in odorless kerosene, showed the two solutions to be equivalent in lethal activity at the concentrations employed.

The novel insecticidal agents may be employed in the form of emulsions, e. g., the compound or a solution of the compound in a suitable organic solvent, suitable organic solvents having been referred to above, may be emulsified in water with the aid of an emulsifying agent, such as sulphofiated oil, a soap, a partial ester of a polyhydric alcohol, or the like, and the emulsion applied as by spraying upon plants, trees, and other things it is desired to protect against the ravages of insects. The novel compounds also may be applied in the form of dusts, mixed with or absorbed by or adsorbed upon suitable carriers, such as clay, talc, wood flour, sulfur, carbon black, or the like. The new compounds may be used as the sole insecticidal agent, or they may be used in conjunction with any of the heretofore known insecticides.

I claim as my invention:

1. N - phenyl-2,6-epoxy - 5 - hexenylidenimine, having the structural formula

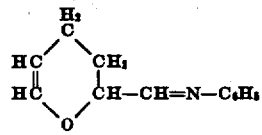

2. 2,6-epoxy - 5 - hexenylidenimine substituted at the imino nitrogen atom by a univalent hydrocarbon radical.

3. An imine wherein the imino nitrogen atom is attached by a double bond to the 2,6-epoxy-5-hexenylidene radical and by a univalent bond to a 2-alkenyl group.

4. An imine wherein the imino nitrogen atom is attached by a double bond to the 2,6-epoxy-5-hexenylidene radical and by a univalent bond to a 2-alkenyl group containing a terminal 2-methylene group.

5. N-methallyl-2,6-epoxy - 5 - hexenylidenimine, having the structural formula

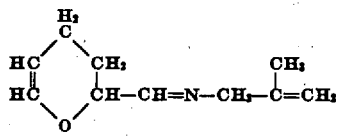

6. An imine wherein the imino nitrogen atom is attached by a double bond to a 2,6-epoxy-5-hexenylidene radical of the formula

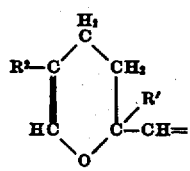

wherein R' and R² are radicals selected from the group consisting of hydrogen and alkyl radicals and by a single bond to a hydrocarbon radical.

7. The dimer of an imine wherein the imino nitrogen atom is attached by a double bond to the 2,6-epoxy-5-hexenylidene radical and by a univalent bond to a hydrocarbon radical, said dimer being that product that forms by spontaneous polymerization of said imine and having when purified the same empirical formula as said imine and a molecular weight substantially twice that of said imine.

8. An insecticidal composition comprising at least one material of the group consisting of N-phenyl-2,6-epoxy-5-hexenylidenimine and the dimer thereof, and a carrier therefor, said dimer being that normally solid product that forms spontaneously when said N-phenyl-2,6-epoxy-5-hexenylidenimine is allowed to stand at about room temperature, and having when purified a melting point of substantially 163° C. to 164° C., the same empirical formula as said N-phenyl-2,6-epoxy-5-hexenylidenimine and a molecular weight substantially twice that of said N-phenyl-2,6-epoxy-5-hexenylidenimine.

9. An insecticidal composition comprising N-phenyl-2,6-epoxy-5-hexenylidenimine and the dimer thereof dissolved in a liquid diluent, said N-phenyl-2,6-epoxy-5-hexenylidenimine having the structural formula

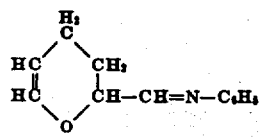

said dimer being that normally solid product that forms spontaneously when said N-phenyl-2,6-epoxy-5-hexenylidenimine is allowed to stand at about room temperature, and having when purified a melting point of substantially 163° C. to 164° C., the same empirical formula as said N-phenyl-2,6-epoxy - 5 - hexenylidenimine and a molecular weight substantially twice that of said N-phenyl-2,6-epoxy-5-hexenylidenimine.

10. The method of preparing an N-hydrocarbyl-2,6-epoxy - 5 - hexenylidenimine which comprises heating 2,6-epoxy 5 - hexen-1-al, having the structural formula

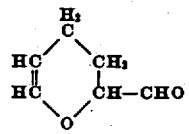

with an N-hydrocarbyl primary organic amine in the presence of an inert volatile organic solvent which forms an azeotropic mixture with water at the pressure that is employed, while continuously distilling an azeotropic mixture of the solvent and water from the reaction mixture, and recovering the resultant N-hydrocarbyl-2,6-epoxy-5-hexenylidenimine.

11. The method of preparing an N-aryl-2,6-epoxy-5-hexenylidenimine which comprises heating a primary aryl amine with 2,6-epoxy-5-hexen-1-al, having the structural formula

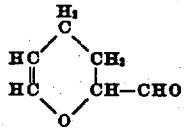

in the presence of an inert volatile organic solvent, removing water from the mixture substantially as it is formed, and recovering from the mixture an N-aryl-2,6-epoxy-5-hexenylidenimine having the structural formula

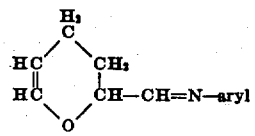

12. The method of preparing an N-hydrocarbyl-2,6-epoxy-5-hexenylidenimine which comprises reacting a 2,6-epoxy-5-hexen-1-al containing from no substituent groups up to two alkyl nuclear substituent groups with an N-hydrocarbyl primary organic amine, separating from the reactants water formed by the reaction substantially coincident with its formation, and recovering an N-hydrocarbyl-2,6-epoxy-5-hexenylidenimine wherein the 2,6-epoxy-5-hexenylidene radical contains from no substituent groups up to two alkyl nuclear substituent groups.

13. An imine wherein the imino nitrogen atom is attached by a double bond to the 2,6-epoxy-5-hexenylidene radical, said 2,6-epoxy-5-hexenylidene radical having the structural formula

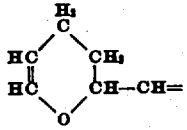

and by a univalent bond to an aryl group.

14. An insecticidal composition comprising at least one material of the group consisting of (a) an imine wherein the imino nitrogen atom is attached by a double bond to the 2,6-epoxy-5-hexenylidene radical said radical having the structural formula

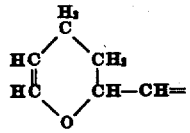

and by a univalent bond to an aryl group and (b) the dimer of said imine, and a carrier therefor, said dimer being that product that forms by spontaneous polymerization of said imine and having when purified the same empirical formula as said imine and a molecular weight substantially twice that of said imine.

15. An insecticidal comprising at least one material of the group consisting of (a) an N-aryl-2,6-epoxy-5-hexenylidenimine and (b) the dimer of said imine, and a carrier therefor, said dimer being that product that forms by spontaneous polymerization of said imine and having when purified the same empirical formula as said imine and a molecular weight substantially twice that of said imine.

16. N-phenyl-2,6-epoxy-5-hexenylidenimine having the structural formula

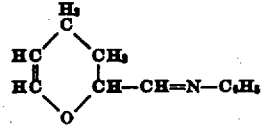

and the dimer of said N-phenyl-2,6-epoxy-5-hexenylidenimine, said dimer being that normally solid product that forms spontaneously when said N-phenyl-2,6-epoxy-5-hexenylidenimine is allowed to stand at about room temperature, and having when purified a melting point of substantially 163° C. to 164° C., the same empirical formula as said N-phenyl-2,6-epoxy-5-hexenylidenimine and a molecular weight substantially twice that of said N-phenyl-2,6-epoxy-5-hexenylidenimine.

RICHARD R. WHETSTONE.

REFERENCES CITED

The following references are of record in the file of this patent:

UNITED STATES PATENTS

| Number | Name | Date |
|---|---|---|
| 2,350,446 | Carruthers et al. | June 6, 1944 |
| 2,421,570 | La Forge | June 3, 1947 |

OTHER REFERENCES

Jacques, Chemical Abstracts, vol. 40, 1946, pages 3749-3750.

Certificate of Correction

Patent No. 2,566,815 September 4, 1951

RICHARD R. WHETSTONE

It is hereby certified that error appears in the printed specification of the above numbered patent requiring correction as follows:

Column 8, lines 22 to 26, for that portion of the structural formula reading

column 12, line 27, for "2,6-epoxy 5-" read *2,6-epoxy-5-*; column 13, line 33, after "insecticidal" insert *composition*;

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*